Patented Dec. 15, 1942

2,305,095

UNITED STATES PATENT OFFICE 2,305,095

METALLIZED AZO DYES

Neil Mitchill Mackenzie, Bound Brook, N. J., assignor to American Cyanamid Company, New York, N. Y., a corporation of Maine No Drawing. Application June 7, 1941, Serial No. 397,084

6 Claims. (Cl. 260—149)

This invention relates to new metallized azo dyes suitable for the production of colors of good to excellent fastness on animal fibers, and particularly to complex chromium compounds of azo dyes.

The products comprising the present invention are metal complexes of dyestuffs represented by the general formula:

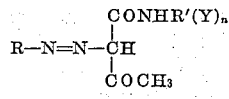

in which R is a radical of the benzene or naphthalene series, in which a metallizable group is ortho to the azo group, or OH and COOH groups are ortho to each other, R' is a hydrocarbon radical of the aliphatic, aralkyl, alicyclic, benzene, biphenyl or naphthalene series, which radicals may be further substituted by halogen, Y is a radical included in the group consisting of $SO_3H$, $SO_2NH_2$ and their salts, $n$ is an integer included in the group consisting of 1, 2, and 3.

These products are prepared by metallizing dyes prepared by coupling diazotized aromatic amines of the formula $RNH_2$ with acetoacetic amides of the formula:

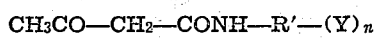

in which R, R' Y and $n$ have the meaning already indicated above. Unmetallized dyes of this type and preparation thereof are not claimed in this application, this being the subject matter of my copending application Serial No. 397,085 filed June 7, 1941.

The azo dyes to be metallized may contain as suitable coupling components compounds such as: 1-acetoacetyl-amino-ethane-2-sulfonic acid, 4-acetoacetylamino-cyclohexane-1-sulfonic acid, 4-acetoacetylamino benzene sulfonic acid, 3-acetoacetyl-amino benzene sulfonic acid, 2-acetoacetylamino-toluene-5-sulfonic acid, 2-chlor-5-acetoacetylamino-toluene - 4 - sulfonic acid, 2-chlor-5-acetoacetylamino-benzene sulfonic acid, 1-acetoacetylamino-benzene-2,5-disulfonic acid, 1-acetoacetylamino-naphthalene-4-sulfonic acid and 1-acetoacetylamino-benzene-3-sulfonamide, and acetoacetylbenzyl-amino sulfonic acid.

Among others the following diazo components may be used in making the azo dyes to be metallized according to the present invention: 2-amino-4-nitrophenol, 2-amino-4-nitro-6-sulfo-phenol, 2-amino-4-sulfo-6-nitrophenol, 2-amino-5-nitrophenol, 2-amino-4-nitro-5-sulfophenol, 2-amino-4-sulfo-phenol, anthranilic acid, 4-sulfophenol, 2-amino-4-chloro-5-sulfophenol, 2-amino-4-sulfo-phenol, anthranillac acid, 4-sulfoanthranilic acid, 2-hydroxy-naphthalene-4-sulfonic acid, the nitro derivative of 1-amino-2-hydroxynaphthalene-4-sulfonic acid, 2-amino-4-methyl-6-nitrophenol, 2-amino-4-methyl - 5-sulphenol and 2-amino-4-methylphenol.

Any of the ordinary metals used in metallizing azo dyes may be employed in the present invention such as chromium, copper, nickel, cobalt and iron. The metals may be used separately as metallizing agents or combinations of metals may be used. The manner in which the metal is attached to the azo dye molecule is not known.

Metallization is effected in the normal manner, for example by refluxing an aqueous solution of the dye with salts or other suitable compounds of the metals or mixed metals. Particular examples of such agents are chromic hydroxide, chromic acetate, chromic formate chromic fluoride, chromic chloride, basic chromic chloride, chromic sulfate, basic chromic sulfate, chromic benzene sulfonate, chromic naphthalene disulfonates and chromic chromate. The metallizing agents may be used in the presence or absence of agents designed to control the pH such as acids, bases and buffers.

Most of the dyes thus produced are yellow to orange to brown powders, some of which are quite soluble in water. Those having limited solubility in water may be dissolved readily in dilute sodium carbonate solution. They dye wool from a bath containing sulfuric acid, level yellow to orange to red shades of good fastness properties.

The invention is illustrated but not limited by the following examples, in which the parts are given by weight.

*Example 1*

50.2 parts of the dyestuff of the formula:

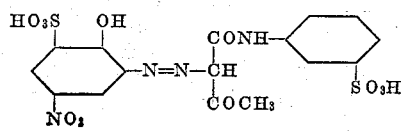

obtained from diazotized 2-amino-4-nitro-6-sulfophenol and 3-acetoacetylamino-benzene sulfonic acid, are dissolved in 1600 parts of water. After the addition of 400 parts of a chromic sulfate solution equivalent to 15.2 parts of chromic oxide and 19.6 parts of sulfuric acid, the mixture is boiled in a reflux apparatus for 24 hours. Upon cooling to room temperature and adding common salt, the new dyestuff is precipitated in crystalline form. It is filtered off and dried at a moderate temperature. This dyestuff is a brown yellow powder which dissolves easily in water. In a bath containing sulfuric acid, it dyes wool fast reddish-yellow shades.

*Example 2*

45.7 parts of the dyestuff of the formula:

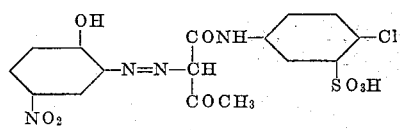

obtained from diazotized 2-amino-4-nitrophenol and 2-chlor-5-acetoacetylamino-benzene sulfonic acid are dissolved in 1150 parts of a hot solution of basic chromic acetate equivalent to 11.4 parts of chromic oxide and 18.0 parts of acetic acid. The solution is then boiled in a reflux apparatus for one hour. Then 338 parts of a dilute sulfuric acid solution, containing 16.6 parts of sulfuric acid, and 510 parts of water are added. The solution is then boiled with stirring for 20 hours. The dye is partially precipitated from the hot solution in crystalline form. After cooling to moderate temperature, the precipitate is filtered off and dried. This dyestuff is a reddish-brown crystalline powder which dissolves somewhat sparingly in water, but quite easily on the addition of sodium carbonate. In a bath containing sulfuric acid it dyes wool fast reddish-yellow shades.

*Example 3*

81.0 parts of the dyestuff of the formula:

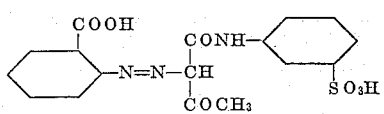

made from diazotized anthranilic acid and 3-acetoacetylamino benzene sulfonic acid, are dissolved in 3400 parts of hot water. Then 61.2 parts of crystalline sodium acetate and 600 parts of a chromic sulfate solution, equivalent to 22.8 parts of chromic oxide and 44.1 parts of sulfuric acid, are added and the solution is boiled in a reflux apparatus for 20 hours with stirring. After cooling, the dye is precipitated from solution by the addition of common salt and filtered off. This dyestuff is a greenish yellow powder which dissolves in hot water. In a bath containing sulfuric acid, it dyes wool, very greenish-yellow tints of good fastness properties.

*Example 4*

101.4 parts of the dyestuff of the formula:

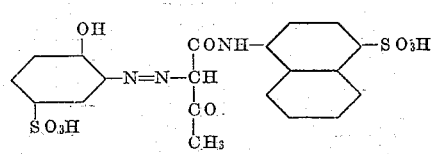

obtained from diazotized 2-aminophenol-4-sulfonic acid and 1-acetoacetylamino-naphthalene-4-sulfonic acid, and 68 parts of crystalline sodium acetate are dissolved in 3400 parts of water. Then 600 parts of a solution of chromic sulfate, equivalent to 22.8 parts of chromic oxide and 44.1 parts of sulfuric acid, are added and the solution is boiled in a reflux apparatus with stirring for 20 hours. The dyestuff is then precipitated by the addition of salt, filtered off, and dried at a moderate temperature. It is soluble in water and dyes wool from an acid bath yellowish-orange shades.

*Example 5*

41.1 parts of the dyestuff of the formula:

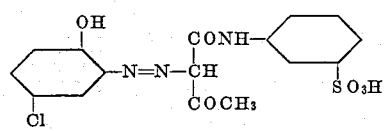

made from diazotized 2-amino-4-chlorophenol and 3-acetoacetylamino-benzene sulfonic acid, are dissolved in 1000 parts of hot water. Then 150 parts of a solution of basic chromic acetate equivalent to 11.4 parts of chromic oxide and 18.0 parts of acetic acid, are added and the solution is boiled in a reflux apparatus for one hour. After dilution by the addition of 510 parts of water, 340 parts of dilute sulfuric acid, containing 16.6 parts of sulfuric acid, are added and the refluxing with stirring is continued for 15 hours. At the end of this time the dye is largely precipitated from the hot solution. It is cooled to 60–70° C. and filtered off in the usual manner. This dyestuff is a reddish-brown powder which dissolves somewhat sparingly in water, but easily on the addition of some sodium carbonate. In a bath containing sulfuric acid, it dyes wool yellowish-orange shades.

*Example 6*

52.0 parts of the dyestuff of the formula:

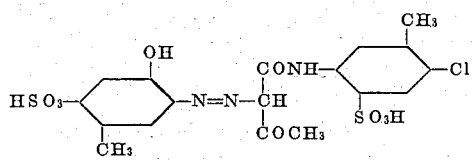

obtained from diazotized 2-amino-4-methylphenol-5-sulfonic acid and 2-acetoacetylamino-4-methyl-5-chlorobenzene sulfonic acid are added to 1000 parts of hot water with stirring. Then 150 parts of a solution of basic chromic acetate, equivalent to 11.4 parts of chromic oxide and 18.0 parts of acetic acid, are added and the solution is boiled in a reflux apparatus with stirring for one hour. The solution is then diluted with 510 parts of water and 340 parts of dilute sulfuric acid solution, containing 16.6 parts of sulfuric acid, are added. The boiling and stirring under reflux are then continued for 20 hours longer. The solution is then cooled and the dyestuff is precipitated in the usual manner by the addition of salt and filtered off. The product obtained gives a reddish-brown powder on drying which is soluble in water and which dyes wool from an acid bath fast orange shades.

Example 7

45.0 parts of the dyestuff of the formula:

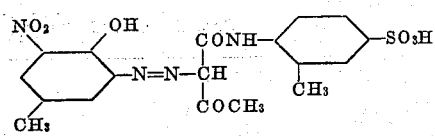

obtained from diazotized 2-amino-4-methyl-6-nitrophenol and 3-methyl-4-acetoacetylamino-benzene sulfonic acid, are added to 1000 parts of water with stirring. Then 150 parts of a solution of basic chromic acetate, equivalent to 11.4 parts of chromic oxide and 18.0 parts of acetic acid, are added and the solution is boiled in a reflux apparatus for one hour. The solution is then diluted with 510 parts of water. 340 parts of a dilute solution of sulfuric acid, containing 16.6 parts of sulfuric acid, are added and the boiling under reflux is continued for 15 hours longer. The metallized dye separates from the hot solution as a crystalline precipitate (parallelogram plates). The solution is cooled and the dye is filtered off. It is washed with cold water. This dyestuff is a brown powder which dissolves somewhat sparingly in water, but easily on the addition of some sodium carbonate. It dyes wool from an acid bath reddish-orange shades.

Example 8

42.1 parts of the dyestuff of the formula:

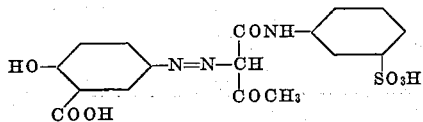

obtained from diazotized 2-carboxy-4-aminophenol and 3-acetoacetylamino-benzene sulfonic acid are dissolved in 1000 parts of hot water. 150 parts of a solution of basic chromium acetate, equivalent to 11.4 parts of chromic oxide and 18.0 parts of acetic acid, are added and the solution is boiled in a reflux apparatus with stirring for one hour. After the addition of 510 parts of water, the solution is acidified by adding 340 parts of a solution of dilute sulfuric acid, containing 16.6 parts of sulfuric acid. The solution is then heated to the boil and boiled under reflux for 24 hours with stirring. The metallized dye is precipitated by adding common salt to the solution at 95° C. and cooling to moderate temperatures. The dye is filtered off and dried. The dyestuff is soluble in dilute sodium carbonate solution and dyes wool from a bath containing sulfuric acid extraordinarily bright greenish-yellow shades having good fastness to washing and fulling.

Example 9

50.7 parts of the dyestuff of the formula:

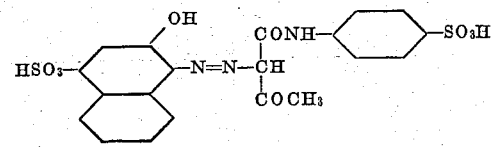

made from diazotized 1-amino-2-hydroxy naphthalene-4-sulfonic acid and 4-acetoacetylamino-benezene sulfonic acid are dissolved in 1000 parts of water. 150 parts of a solution of basic chromic acetate, equivalent to 11.4 parts of chromic oxide and 18.0 parts of acetic acid, are added and the solution is boiled in a reflux apparatus for one hour with stirring. The solution is then diluted with 830 parts of water. 27.6 parts of formic acid are added and the solution is boiled under reflux for four hours longer with stirring. It is isolated by the addition of common salt. The dyestuff is soluble in water and dyes wool from a bath containing sulfuric acid bluish-red shades.

Example 10

36.0 parts of dyestuff of the formula:

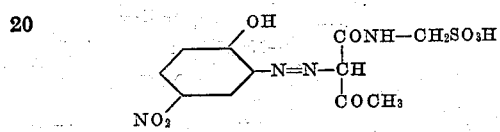

obtained from diazotized 2-amino-4-nitrophenol and acetoacetylamino-methane sulfonic acid are dissolved in 1,000 parts of water. 150 parts of a solution of basic chromic acetate, equivalent to 11.4 parts of chromic oxide and 18.0 parts of acetic acid, are added and the solution is boiled in a reflux apparatus with stirring for one hour. The solution is diluted with 520 parts of water. Then 340 parts of a sulfuric acid solution, containing 16.6 parts of sulfuric acid, are added. The solution is then boiled in a reflux apparatus for 20 hours. On cooling to room temperature the chromium derivative is precipitated in crystalline form (dark parallelogram plates with a metallic lustre). The new dyestuff is slightly soluble in cold water but readily soluble in hot water. It dyes wool from a bath containing sulfuric acid bright yellow shades.

Example 11

40.9 parts of the dyestuff of the formula:

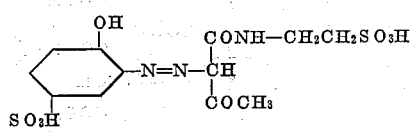

obtained from diazotized 2-amino-4-sulfophenol and acetoacetylamino ethane sulfonic acid are dissolved in 1000 parts of water. 150 parts of a basic chromic acetate solution, equivalent to 11.4 parts of chromic oxide and 18 parts of acetic acid, are added and the solution is boiled in a reflux apparatus with stirring for one hour. The solution is then diluted with 510 parts of water. 340 parts of a dilute solution of sulfuric acid, containing 16.6 parts of sulfuric acid, are added and the solution is boiled under reflux with stirring for 20 hours. The excess of chromium is precipitated at the boil by adding an excess of dilute sodium carbonate solution and filtered off. The filtrate is neutralized with dilute hydrochloric acid and the solution is evaporated to dryness. The new product is obtained as a brown powder. It is readily soluble in water. It dyes wool from a bath containing sulfuric acid bright reddish yellow shades having good fastness properties.

Further examples are listed in the following table:

| Unchromated dyestuff | Chroming method | Shade of dyeing on wool |
|---|---|---|
| $NO_2$-C$_6$H$_3$(OH)-N=N-CH(COCH$_3$)-CONH-C$_6$H$_4$-SO$_3$H | Example 2 | Reddish yellow. |
| $NO_2$-C$_6$H$_3$(OH)-N=N-CH(COCH$_3$)-CONH-C$_6$H$_4$-SO$_3$H | Example 10. Total reflux time 70 hours. | Do. |
| $NO_2$-C$_6$H$_3$(OH)-N=N-CH(COCH$_3$)-CONH-C$_6$H$_3$(SO$_3$H)-SO$_3$H | Example 2 | Do. |
| HO$_3$S, O$_2$N-C$_6$H$_2$(OH)-N=N-CH(COCH$_3$)-CONH-C$_6$H$_4$-SO$_2$NH$_2$ | Example 4. Reflux time 50 hours. | Do. |
| SO$_3$H-C$_6$H$_3$(OH)-N=N-CH(COCH$_3$)-CONH-C$_6$H$_4$-SO$_3$H | Example 1 | Do. |
| SO$_3$H-C$_6$H$_3$(OH)-N=N-CH(COCH$_3$)-CONH-C$_6$H$_4$-SO$_3$H | Example 4 | Do. |
| SO$_3$H-C$_6$H$_3$(OH)-N=N-CH(COCH$_3$)-CONH-C$_6$H$_3$(CH$_3$)-SO$_3$H | Example 2 | Do. |
| COOH-C$_6$H$_4$-N=N-CH(COCH$_3$)-CONH-C$_6$H$_3$(SO$_3$H)-SO$_3$H | Example 3 | Greenish yellow. |
| COOH-C$_6$H$_4$-N=N-CH(COCH$_3$)-CONH-C$_6$H$_4$-SO$_3$H | do | Do. |
| COOH-C$_6$H$_4$-N=N-CH(COCH$_3$)-CONH-C$_6$H$_3$(CH$_3$)-SO$_3$H | do | Do. |
| HSO$_3$-C$_{10}$H$_5$(OH)-N=N-CH(COCH$_3$)-CONH-C$_6$H$_4$-SO$_3$H | Example 10 | Red. |
| HSO$_3$-C$_{10}$H$_5$(OH)-N=N-CH(COCH$_3$)-CONH-C$_6$H$_3$(Cl)-SO$_3$H | Example 1 | Do. |

*Example 12*

4.22 parts of the dyestuff of the formula:

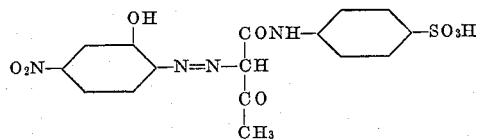

obtained from diazotized 2-amino-5-nitro-phenol and 4-acetoacetylamino benzene sulfonic acid are dissolved in 100 parts of hot water. 10.0 parts of crystalline sodium acetate are added. Then 100 parts of a solution of cupric acetate, equivalent to 0.88 part of cupric oxide, are added and the solution is heated at 90-100° C. until the formation of the cupric complex is complete. The dye is precipitated by the addition of salt, filtered off and dried. The new product is a dark red powder which is soluble in water. It dyes wool from a bath containing acetic acid reddish orange shades.

If, in the above procedure, 100 parts of a solution of nickelous chloride, containing 2.61 parts of $NiCl_2.6H_2O$, is used in place of the cupric acetate solution, a nickel complex is obtained which dyes wool from a bath containing acetic acid orange shades.

*Example 13*

1.80 parts of the dyestuff of the formula:

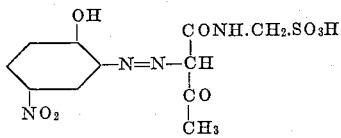

obtained from diazotized 2-amino-4-nitrophenol and acetoacetylamino methane sulfonic acid are dissolved in 50 parts of water. 5.0 parts of crystalline sodium acetate are added. Then 50 parts of a solution of cobaltous chloride (containing 1.31 parts of $CoCl_2.6H_2O$) are added and the solution is heated with stirring at 90-100° C. until the formation of the cobalt complex is complete. The dye is precipitated by the addition of salt, filered off and dried. It is obtained in the form of a brown water soluble powder. The new product dyes wool from a bath containing acetic acid reddish yellow shades.

What I claim is:

1. As new products the complex metallized compounds of the dyes of the general formula:

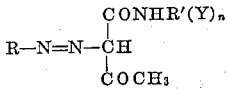

in which R is a member of the group consisting of radicals of the benzene series and naphthalene series, containing at least one metallizable group chosen from the class consisting of OH and COOH ortho to the azo group, R' is selected from the group consisting of hydrocarbon radicals of the lower alkylene, alicyclic, aralkyl, benzene and biphenyl series, Y is a radical included in the group consisting of $SO_3H$ and its salts, and $n$ is an integer included in the group consisting of 1, 2, and 3.

2. New metallized dyes in accordance with claim 1 in which the metal complex is a chromium compound.

3. As new products the complex chromium compounds of the dyes of the formula:

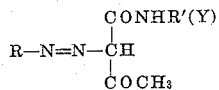

in which R is a benzene radical in which an OH group is ortho to the azo group, R' is a hydrocarbon radical of the benzene series and Y is $SO_3H$.

4. Complex chromium compounds of the dye having the formula:

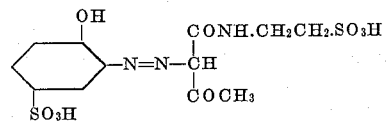

5. Complex chromium compounds of the dye having the formula:

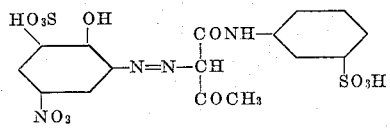

6. Complex chromium compounds of the dye having the formula:

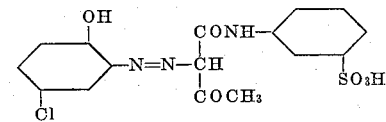

NEIL MITCHILL MACKENZIE.